United States Patent
Lee et al.

(10) Patent No.: US 12,173,537 B2
(45) Date of Patent: Dec. 24, 2024

(54) SLIDING DOOR DEVICE FOR VEHICLE

(71) Applicants: Hyundai Motor Company, Seoul (KR); Kia Corporation, Seoul (KR); Kwangjin Co., Ltd., Asan-si (KR)

(72) Inventors: Jaeseung Lee, Whasung-Si (KR); Jinsu Jang, Whasung-Si (KR); Taeyong Jeon, Whasung-Si (KR)

(73) Assignees: Hyundai Motor Company, Seoul (KR); Kia Corporation, Seoul (KR); Kwangjin Co, Ltd., Asan-si (KR)

( * ) Notice: Subject to any disclaimer, the term of this patent is extended or adjusted under 35 U.S.C. 154(b) by 0 days.

(21) Appl. No.: 18/204,144

(22) Filed: May 31, 2023

(65) Prior Publication Data

US 2024/0110412 A1    Apr. 4, 2024

(30) Foreign Application Priority Data

Oct. 4, 2022  (KR) .................. 10-2022-0126387

(51) Int. Cl.
| | |
|---|---|
| *B60J 5/06* | (2006.01) |
| *E05B 79/20* | (2014.01) |
| *E05B 83/40* | (2014.01) |
| *E05B 85/26* | (2014.01) |
| *E05C 17/60* | (2006.01) |
| *E05D 15/06* | (2006.01) |
| *E05D 15/10* | (2006.01) |
| *E05D 15/14* | (2006.01) |

(52) U.S. Cl.
CPC .............. *E05D 15/101* (2013.01); *B60J 5/06* (2013.01); *E05B 79/20* (2013.01); *E05B 83/40* (2013.01); *E05B 85/26* (2013.01); *E05D 13/04* (2013.01); *E05D 15/0665* (2013.01); *E05D 15/14* (2013.01); *E05Y 2900/531* (2013.01)

(58) Field of Classification Search
CPC .......... E05D 2015/1031; E05D 15/101; E05D 15/1005; E05D 2015/1028; E05D 15/10; E05D 15/06; E05D 15/00
See application file for complete search history.

(56) References Cited

U.S. PATENT DOCUMENTS

| | | | |
|---|---|---|---|
| 9,545,834 B2 * | 1/2017 | Choi | ..................... B60J 5/06 |
| 9,777,811 B2 * | 10/2017 | Choi | ..................... E05D 15/101 |
| 10,024,084 B2 * | 7/2018 | Choi | ..................... E05B 83/40 |

(Continued)

*Primary Examiner* — Janet M Wilkens
*Assistant Examiner* — Susan M. Heschel
(74) *Attorney, Agent, or Firm* — Morgan, Lewis & Bockius LLP

(57) ABSTRACT

A sliding door device for a vehicle includes a door, a lower arm including a first end portion connected to an internal side of the door and a second end portion provided to slide along a vehicle body rail provided on the vehicle body, a linear slider rotatably connected to the second end portion of the lower arm and provided to slide along a linear rail provided on the vehicle body, a slider assembly provided between the lower arm and the internal side of the door, and allowing the door to slide with respect to the first end portion of the lower arm, an arm latch located between the lower arm and the linear slider and fixing and releasing the sliding of the second end portion of the lower arm, and a door latch located between the lower arm and the slider assembly and allowing the slider assembly to be slidably fixed or released.

17 Claims, 11 Drawing Sheets

(56) References Cited

U.S. PATENT DOCUMENTS

| | | | |
|---|---|---|---|
| 10,138,662 B2* | 11/2018 | Yun | E05B 77/54 |
| 11,002,054 B2* | 5/2021 | Stoepker | E05D 15/1047 |
| 11,555,343 B2* | 1/2023 | Yun | B60J 5/047 |
| 2015/0167370 A1* | 6/2015 | Choi | E05D 15/1081 |
| | | | 403/83 |

* cited by examiner

SLIDING DOOR DEVICE FOR VEHICLE

CROSS-REFERENCE TO RELATED APPLICATION

The present application claims priority to Korean Patent Application No. 10-2022-0126387 filed on Oct. 4, 2022, the entire contents of which is incorporated herein for all purposes by this reference.

BACKGROUND OF THE PRESENT DISCLOSURE

Field of the Present Disclosure

The present disclosure relates to a sliding door device for a vehicle. More particularly, the present disclosure relates to a sliding door device for a vehicle which is configured to open or close a door opening of a vehicle body by sliding forwards and backwards in a longitudinal direction of the vehicle.

Description of Related Art

In general, a vehicle is provided with a vehicle compartment having a predetermined size in which a driver or accompanying passengers may board, and a vehicle body is provided with a vehicle compartment opening/closing door to open or close the vehicle compartment.

In the case of a passenger car, the vehicle compartment opening/closing door includes a front door provided in the front in the longitudinal direction of the vehicle and a rear door provided in the rear in the longitudinal direction of the vehicle, and the front door and the rear door are usually rotatably provided on the vehicle body via a hinge.

In the case of a van in which many people may board, the vehicle compartment opening/closing door is configured to open or close the vehicle compartment while sliding back and forth in the longitudinal direction of the vehicle.

The sliding vehicle compartment opening/closing door of the van is configured to move backward in the longitudinal direction of the vehicle to open the vehicle compartment but move forward in the longitudinal direction of the vehicle to close the vehicle compartment, and as a result, has the advantage of having a small opening/closing space required for opening/closing the door and being able to completely open a door opening formed in a vehicle body even in a narrow opening/closing space, compared to hinged vehicle compartment opening/closing door of a passenger car.

However, in the conventional sliding vehicle compartment opening/closing door, when the door is opened and closed, due to a fixed sliding door arm (lower arm) structure, a space in which the door arm is provided to penetrate into a side seal part of the vehicle is excessive. As a result, the conventional sliding vehicle compartment opening/closing door has a problem of increasing a floor height of a vehicle to secure the space.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sliding door device for a vehicle having advantages of minimizing a space in which a lower arm is provided to penetrate into a side seal portion of the vehicle and expanding an opening width by applying a fastening structure of a catch and a striker to the lower arm and additionally employing a slidable door.

Various aspects of the present disclosure are directed to providing a sliding door device for a vehicle including a door that opens or closes a door opening formed in a vehicle body, a lower arm including a first end portion connected to an internal side of the door and a second end portion provided to slide along a vehicle body rail provided on the vehicle body, a linear slider which is rotatably connected to the second end portion of the lower arm and provided to slide along a linear rail provided on the vehicle body, a slider assembly which is provided between the first end portion of the lower arm and the internal side of the door, and allows the door to slide with respect to the first end portion of the lower arm, an arm latch which is located between the second end portion of the lower arm and the linear slider and fixes or releases the sliding of the second end portion of the lower arm, and a door latch which is located between the first end portion of the lower arm and the slider assembly and allows the slider assembly to be slidably fixed or released.

The vehicle body rail may include a lower rail and an upper rail that extend in a longitudinal direction from a lower side of the vehicle body, and the linear slider may include a linear roller, and the linear roller rolls and slides along the linear rail.

An end portion of the linear rail may be provided with a stopper that limits movement of the linear slider.

The sliding door device may further include: a door hold open latch that maintains or releases a state in which the slider assembly slides, in which the slider assembly may slide along a slider rail extending in a longitudinal direction of a back plate provided on the internal surface of the door.

The sliding of the slider assembly may be connected to a door handle of the vehicle to be driven independently.

The arm latch and the door latch may be provided on a same surface of the lower arm 3.

The arm latch may include an arm catch which is rotatably provided at the second end portion of the lower arm, and an arm pawl that fixes or releases the rotation of the arm catch.

When primary sliding of the door is completed during door opening, the arm catch may rotate while being fitted into an arm striker provided at an end portion of the vehicle body.

The arm pawl may be in contact with an end face of the arm catch, and may be inserted into a groove formed on the end face of the arm catch when the arm catch rotates, so that the rotation of the arm catch may stop.

The arm catch and the arm pawl may be assembled to an arm latch base and coupled to the second end portion of the lower arm.

The door latch may include a door catch which is rotatably provided at the first end portion of the lower arm, and a door pawl that fixes or releases the rotation of the door catch.

The door catch may rotate while being fitted into a door striker provided in the internal side of the door while the door primarily slides during door closing.

The door pawl may contact with an end face of the door catch, and may be inserted into a groove formed on the end face of the door catch when the door catch rotates, so that the rotation of the door catch may stop.

The door catch and the door pawl may be assembled to a door latch base and coupled to the first end portion of the lower arm.

The arm catch and the door pawl may be interlocked by being connected to each other by a cable, and when the arm catch rotates while being fitted into the arm striker, the cable may pull and rotate the door pawl, and the door catch may be unlocked from the door pawl.

The cable may be guided by a cable holder provided at a center portion of one surface of the lower arm.

The door hold open latch may include an open catch which is rotatably provided at one end portion of a back plate provided on the internal surface of the door, and an open pawl that fixes or releases the rotation of the open catch.

The open catch may rotate while being fitted into an open striker provided in the slider assembly while the door secondarily slides during door opening.

The open pawl is in contact with an end face of the open catch, and is inserted into a groove formed on the end face of the open catch when the open catch rotates, so that the rotation of the open catch may stop.

The open catch and the open pawl may be assembled to an open latch base and coupled to the back plate.

According to various exemplary embodiments of the present disclosure, by applying a fastening structure of a catch and a striker to a lower arm and additionally employing a slidable door, the amount of penetration of the lower arm into a vehicle body may be eliminated and a flat structure of the vehicle body is implemented, so it is possible to reduce a step height of the vehicle body.

Furthermore, by implementing movement of a door in a linear direction, it is possible to improve a degree of freedom of layout and a degree of freedom of interior design.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
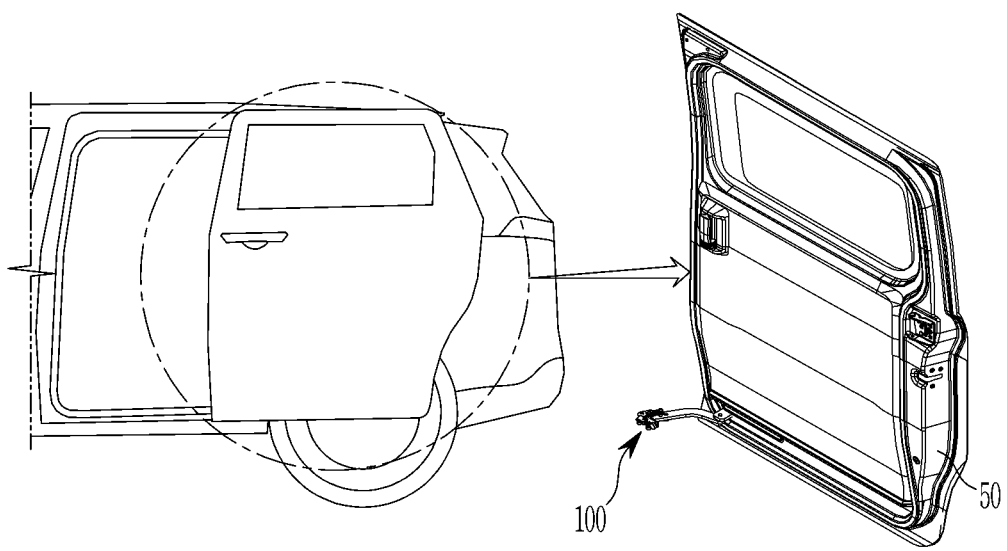
FIG. 1 is a diagram illustrating a state in which a sliding door device for a vehicle according to various exemplary embodiments of the present disclosure is applied to a door of a vehicle.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, several exemplary embodiments of the present disclosure will be described in detail with reference to the accompanying drawings so that those skilled in the art to which an exemplary embodiment of the present disclosure pertains may easily practice the present disclosure. However, the present disclosure may be implemented in various different forms and is not limited to exemplary embodiments provided herein.

Furthermore, in several exemplary embodiments of the present disclosure, components having the same configuration will be representatively described using the same reference numerals in an exemplary embodiment of the present disclosure, and only components different from those of an exemplary embodiment will be described in the other exemplary embodiments of the present disclosure.

Note that the drawings are schematic and not drawn to scale. Relative dimensions and proportions of parts in the drawings are shown exaggerated or reduced in size for clarity and convenience in the drawings, and any dimensions are illustrative only and are not limited. Furthermore, a same reference numerals are used to indicate similar features in the same structures, elements, or parts appearing in two or more drawings. When a part is referred to as being "above" or "on" other parts, it may be directly above other parts, or other parts may be included in between.

The present disclosure specifically represents an exemplary embodiment of the present disclosure. As a result, various variations of the diagram are expected. Accordingly, various exemplary embodiments are not limited to a specific shape of the illustrated area, and may include, for example, a shape modification by manufacturing.

Hereinafter, a structure of a sliding door device for a vehicle according to various exemplary embodiments of the present disclosure will be described in detail with reference to the accompanying drawings.

Figure 2:
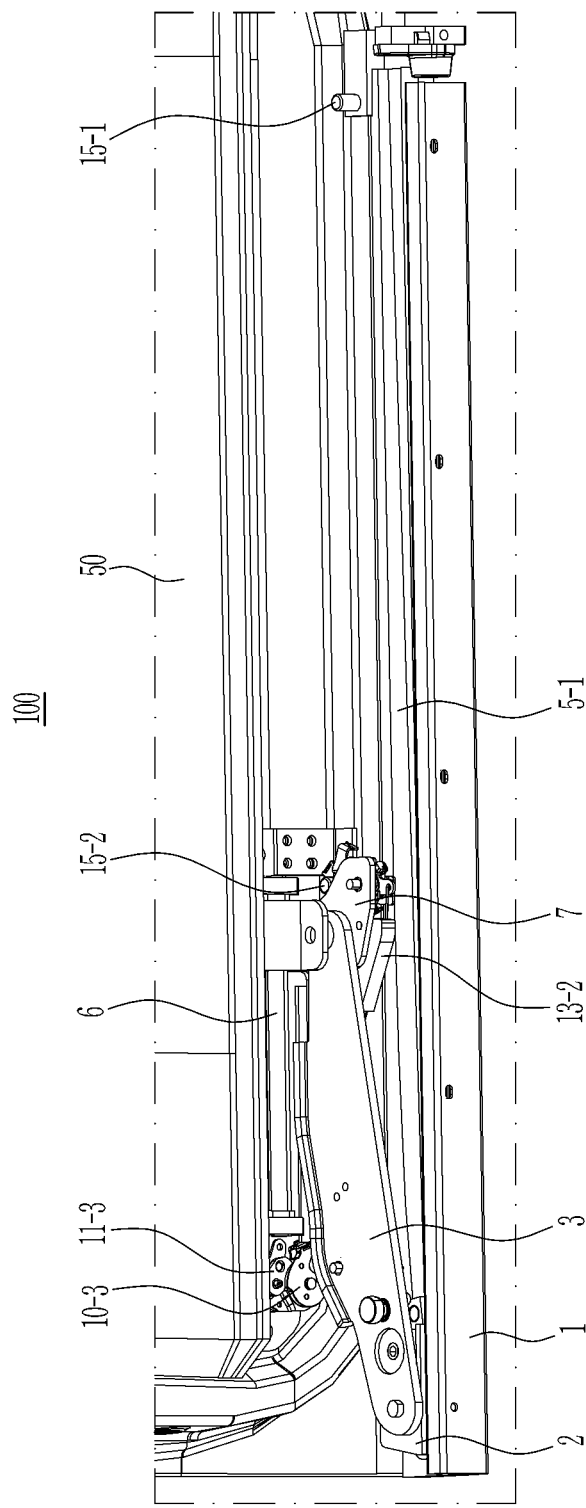
FIG. 2 is a diagram illustrating the sliding door device for a vehicle according to the exemplary embodiment of the present disclosure.

FIG. 1 is a diagram illustrating a state in which a sliding door device for a vehicle according to various exemplary embodiments of the present disclosure is applied to a door of a vehicle, and FIG. 2 is a diagram illustrating the sliding door device for a vehicle according to the exemplary embodiment of the present disclosure.

Referring to FIG. 1 and FIG. 2, the sliding door device for a vehicle according to various exemplary embodiments of the present disclosure may be applied to a lower side of a rear door 50 provided at the rear in a longitudinal direction of the vehicle, and may be applied to a structure in which the rear door 50 is opened or closed by moving in and out of the vehicle and sliding back and forth in a longitudinal direction of the vehicle.

Referring to FIG. 2, the sliding door device for a vehicle according to various exemplary embodiments of the present disclosure includes a door 50, a lower arm 3, a linear slider 2, a slider assembly 7, an arm latch A, a door latch B, and a door hold open latch C.

The door 50 opens or closes an opening of the door 50 formed in a vehicle body of the vehicle, and the lower arm 3 is connected to the door 50 and the vehicle body. One end portion of the lower arm 3 may be connected to an internal side of the door 50 and extend toward a side seal of the vehicle body. Furthermore, the other end portion of the lower arm 3 may slide along a vehicle body rail provided in the vehicle body. The vehicle body rail may include a lower rail 5-1 and an upper rail 5-2 extending from a lower side of the vehicle body in the longitudinal direction thereof.

The linear slider 2 may be rotatably connected to the other end portion of the lower arm 3 and may slide the other end portion of the lower arm 3 along the linear rail 1 provided on the lower side of the vehicle body.

An end portion of the linear rail 1 may be provided with a stopper 12 that limits movement of the linear slider 2.

The slider assembly 7 is provided between one end portion of the lower arm 3 and the internal side of the door 50, and allows the door 50 to slide with respect to one end portion of the lower arm 3. In the instant case, the sliding movement of the slider assembly 7 may be driven independently by being connected to a handle of the door 50 of the vehicle, and the slider assembly 7 may slide along a slider rail 6 that extends in a longitudinal direction of a back plate 8 provided on an internal surface of the door 50.

The arm latch A is located between the other end portion of the lower arm 3 and the linear slider 2, and fixes or releases the sliding of the other end portion of the lower arm 3.

Furthermore, the door latch B is located between one end portion of the lower arm 3 and the slider assembly 7 and allows the slider assembly 7 to be slidably fixed and released. The arm latch A and the door latch B may be provided on the same surface of the lower arm 3.

The door hold open latch C maintains or releases in a state in which the slider assembly 7 slides.

The detailed operation of the arm latch A, the door latch B, and the door hold open latch C will be described in detail in the attached drawing below.

Figure 3:
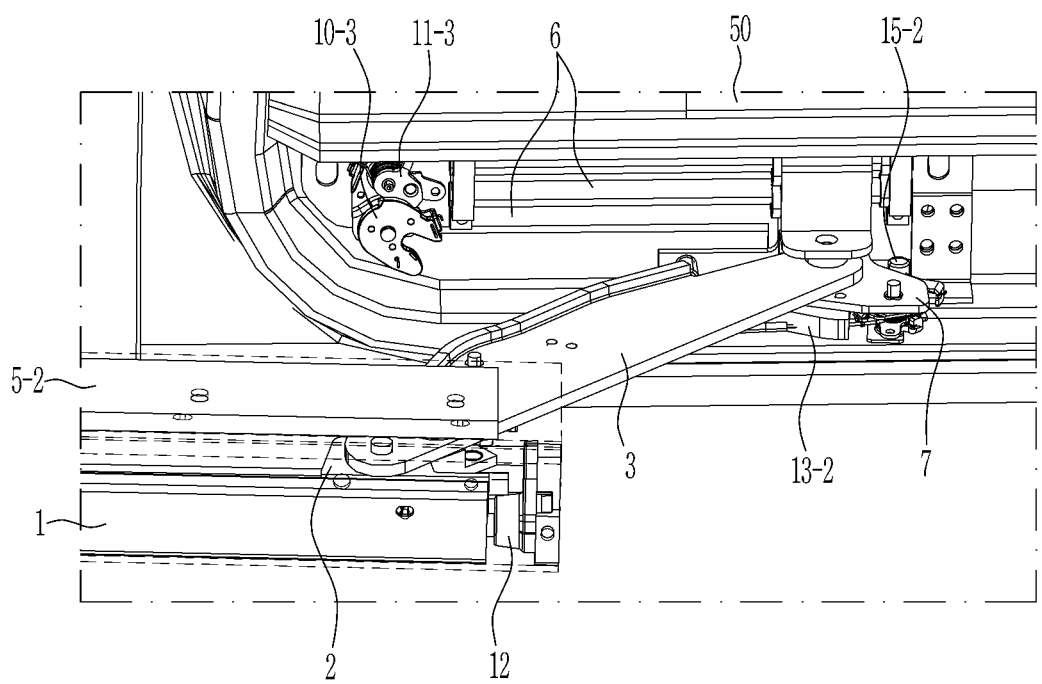
FIG. 3 is a diagram illustrating a state in which primary sliding of a door is completed by the sliding door device for a vehicle according to the exemplary embodiment of the present disclosure.
Figure 4:
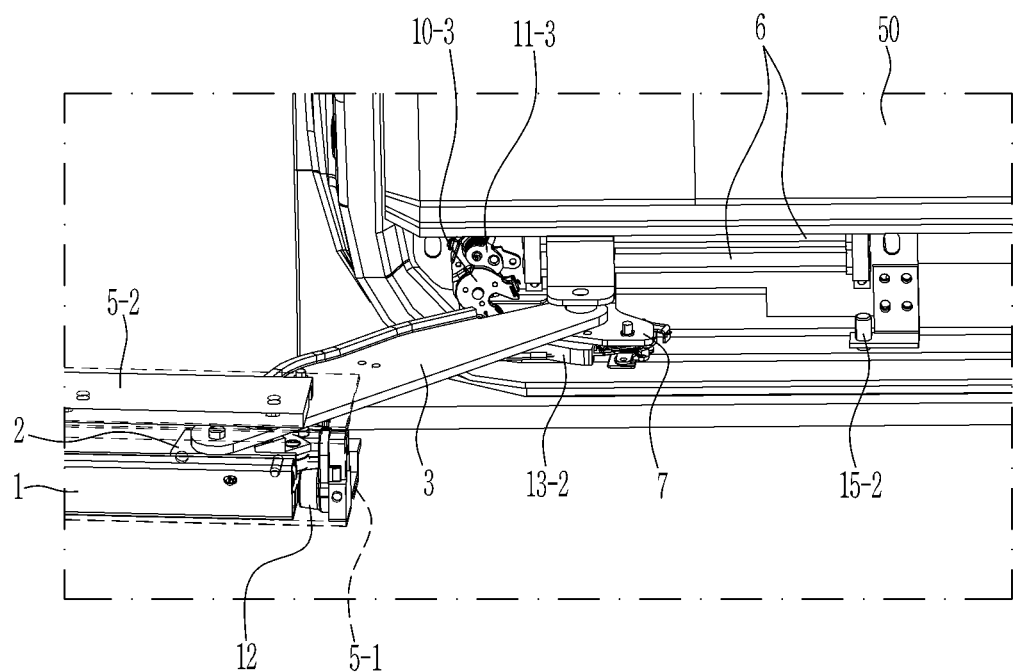
FIG. 4 is a diagram illustrating a state in which secondary sliding of the door is completed by the sliding door device for a vehicle according to the exemplary embodiment of the present disclosure.

FIG. 3 is a diagram illustrating a state in which primary sliding of a door is completed by the sliding door device for a vehicle according to the exemplary embodiment of the present disclosure, and FIG. 4 is a diagram illustrating a state in which secondary sliding of the door is completed by the sliding door device for a vehicle according to the exemplary embodiment of the present disclosure.

Figure 5:
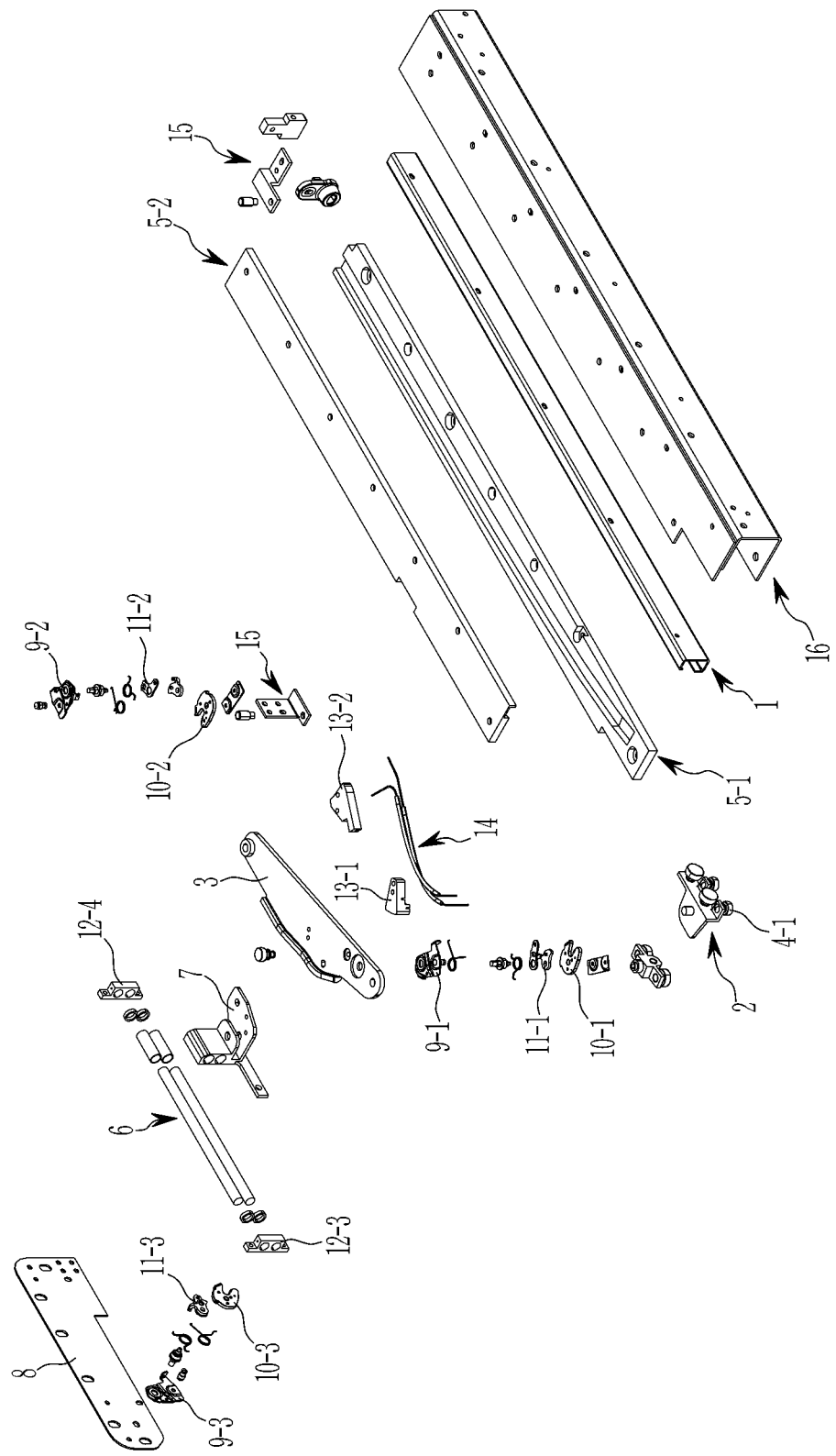
FIG. 5 is an exploded perspective view of the sliding door device for a vehicle according to the exemplary embodiment of the present disclosure.

Referring to FIG. 3, FIG. 4, and FIG. 5, when the first sliding of the door 50 is completed by the sliding door device for a vehicle according to the exemplary embodiment of the present disclosure, the linear slider 2 connected to the other end portion of the lower arm 3 to rotate is completed sliding along linear rail 1 and is in contact with the stopper 12. In the present process, one end portion of the lower arm 3 turns toward the outside of the vehicle, and the door 50 connected to one end portion of the lower arm 3 is opened toward the outside of the vehicle.

In the instant case, the slider assembly 7 connected to one end portion of the lower arm 3 is located on a right end portion of the slider rail 6 extending in the longitudinal direction of the back plate 8 provided on the internal surface of the door 50. Furthermore, the arm latch A fixes the sliding of the other end portion of the lower arm 3, and the door latch B interlocked with the arm latch A is unlocked from the slider assembly 7 at one end portion of the lower arm 3.

After the primary sliding of the door 50 is completed, the secondary sliding of the door 50 to the right is performed while the other end portion of the lower arm 3 is rotationally fixed. Accordingly, the slider rail 6 provided on the back plate 8 of the door 50 moves to the right, and as a result, the slider assembly 7 slides to the left along the slider rail 6. That is, the door 50 slides while the position of the slider assembly 7 is fixed. When the secondary sliding is completed, the door hold open latch C fixes the slider assembly 7 to prevent the door 50 from moving.

Figure 6:
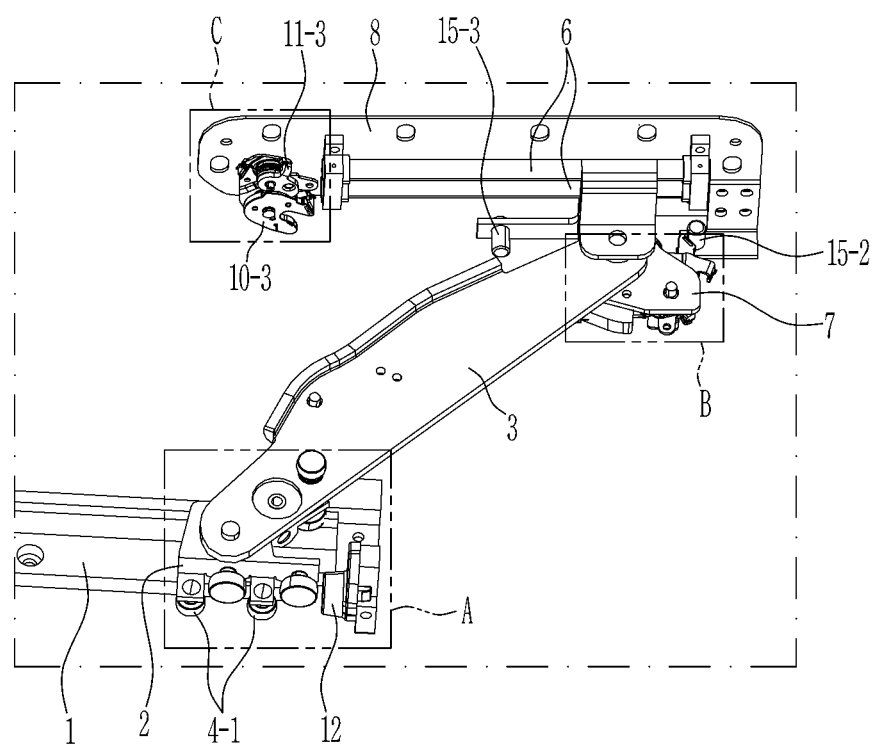
FIG. 6 is a diagram illustrating a state of an arm latch, a door latch, and a door hold open latch after the primary sliding of the door is completed by the sliding door device for a vehicle according to the exemplary embodiment of the present disclosure.
Figure 7:
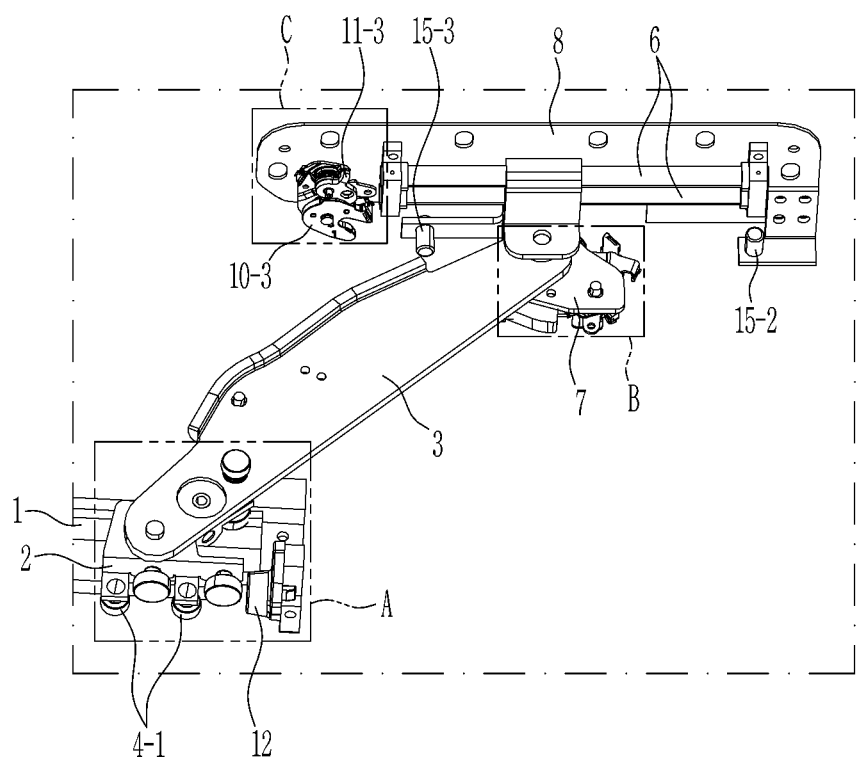
FIG. 7 is a diagram illustrating the state of the arm latch, the door latch, and the door hold open latch during the secondary sliding after the primary sliding of the door is completed by the sliding door device for a vehicle according to the exemplary embodiment of the present disclosure.
Figure 8:
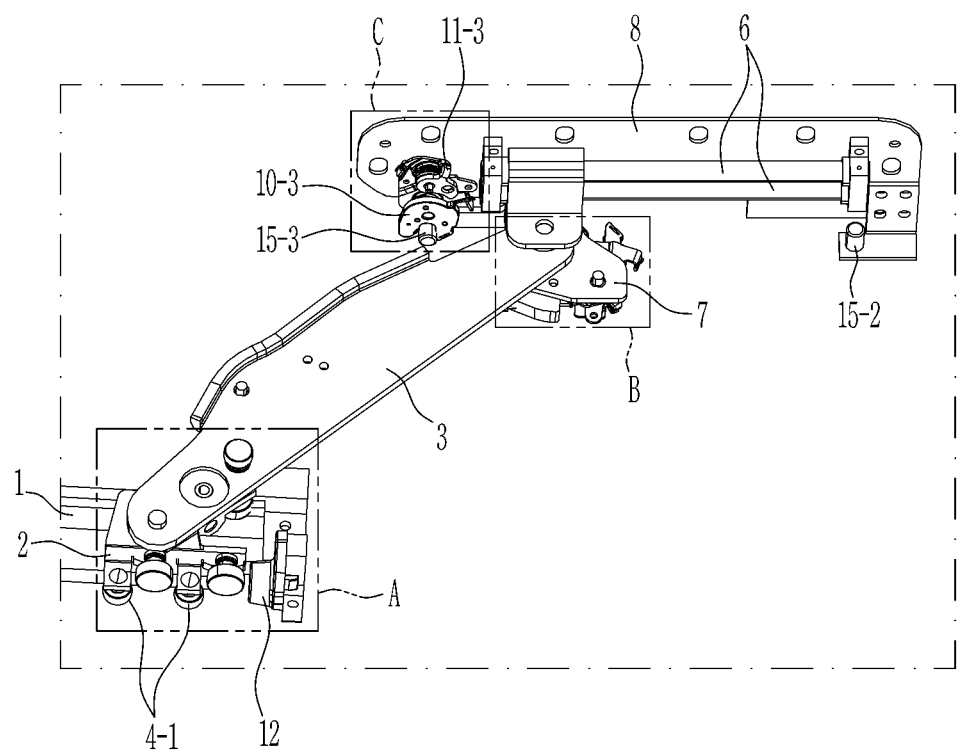
FIG. 8 is a diagram illustrating the state of the arm latch, the door latch, and the door hold open latch after the secondary sliding of the door is completed by the sliding door device for a vehicle according to the exemplary embodiment of the present disclosure.

FIG. 6 is a diagram illustrating a state of an arm latch, a door latch, and a door hold open latch after the primary sliding of the door is completed by the sliding door device for a vehicle according to the exemplary embodiment of the present disclosure, FIG. 7 is a diagram illustrating the state of the arm latch, the door latch, and the door hold open latch during the secondary sliding after the primary sliding of the door is completed by the sliding door device for a vehicle according to the exemplary embodiment of the present disclosure, and FIG. 8 is a diagram illustrating the state of the arm latch, the door latch, and the door hold open latch after the secondary sliding of the door is completed by the sliding door device for a vehicle according to the exemplary embodiment of the present disclosure.

Referring to FIG. 6, the linear slider 2 includes a linear roller 4-1, and the linear roller 4-1 rolls and slides along the linear rail 1. When the primary sliding of the door 50 is completed, the linear slider 2 is in contact with the stopper 12. Furthermore, the slider assembly 7 is located at the right end portion of the slider rail 6 extending in the longitudinal direction of the back plate 8 provided on the internal surface of the door 50. The arm latch A fixes the sliding of the other end portion of the lower arm 3 while the lower arm 3 and the linear slider 2 are in contact with the stopper 12, and the door latch B interlocked with the arm latch A is unlocked from the slider assembly 7 of one end portion of the lower arm 3 and prepares for the secondary sliding.

Referring to FIG. 7, after the primary sliding of the door 50 is completed, the fixation of one end portion of the lower arm 3 is released while the rotation of the other end portion of the lower arm 3 is fixed, and the slider assembly 7 at one end portion of the lower arm 3 is in a state where the slider assembly 7 may slide along the slider rail 6 extending in the longitudinal direction of the back plate 8. As the door 50 moves to the right, the secondary sliding starts. The slider rail 6 provided on the back plate 8 of the door 50 moves to the right, and as a result, the slider assembly 7 slides to the left along the slider rail 6.

Referring to FIG. 8, when the slider assembly 7 is in contact with the left end portion along the slider rail 6, the secondary sliding is completed. In the instant case, the slider assembly 7 is slidably fixed by the door hold open latch C provided on the back plate 8. The door hold open latch C fixes the slider assembly 7 to prevent the door 50 from moving.

Figure 9:
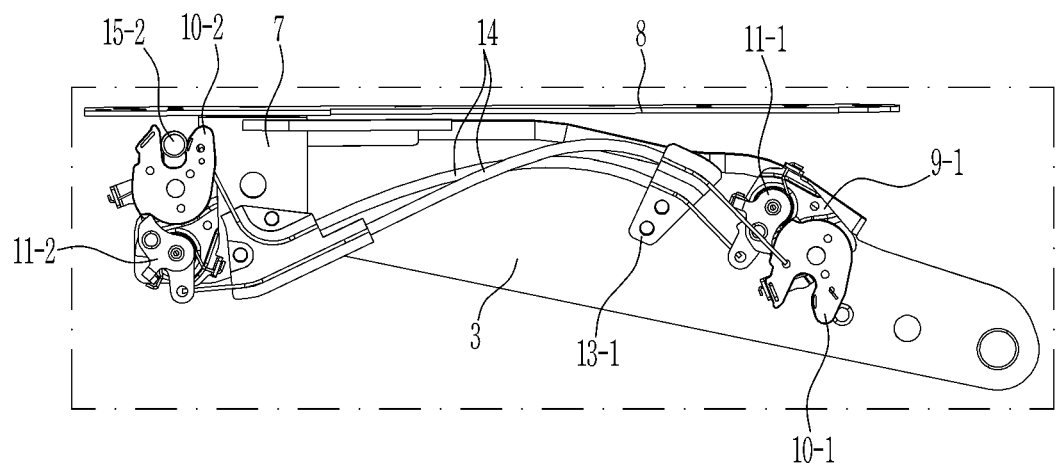
FIG. 9 is a diagram illustrating the arm latch and the door latch provided on one side of a lower arm of the sliding door device for a vehicle according to the exemplary embodiment of the present disclosure.

FIG. 9 is a diagram illustrating the arm latch and the door latch provided on one side of a lower arm of the sliding door device for a vehicle according to the exemplary embodiment of the present disclosure.

Referring to FIG. 9, the arm latch A and the door latch B may be provided on one surface, that is, the lower surface of the lower arm 3.

The arm latch A may include an arm catch 10-1 which is rotatably provided at the other end portion of the lower arm 3 and an arm pawl 11-1 that fixes or releases the rotation of the arm catch 10-1. The arm pawl 11-1 is in contact with the end face of the arm catch 10-1, and inserted into a groove formed on the end face of the arm catch 10-1 when the arm catch 10-1 rotates, so that the rotation of the arm catch 10-1 may stop. The arm catch 10-1 and the arm pawl 11-1 may be assembled to an arm latch base 9-1 and coupled to the other end portion of the lower arm 3.

Furthermore, the door latch B may include a door catch 10-2 which is rotatably provided at one end portion of the lower arm 3 and a door pawl 11-2 that fixes or releases the rotation of the door catch 10-2. The door pawl 11-2 may be in contact with the end face of the door catch 10-2, and may be inserted into the groove formed on the end face of the door catch 10-2 when the door catch 10-2 rotates, so that the rotation of the door catch 10-2 may stop. The door catch 10-2 and the door pawl 11-2 may be assembled to the door latch base 9-2 and coupled to one end portion of the lower arm 3.

The arm latch A and the door latch B may be interlocked by being connected to each other by a cable 14. That is, when the arm catch 10-1 rotates and the arm catch 10-1 is rotationally fixed by the arm pawl 11-1, the door pawl 11-2 rotates so that the door catch 10-2 is unlocked by the door pawl 11-2, and vice versa.

Figure 10:
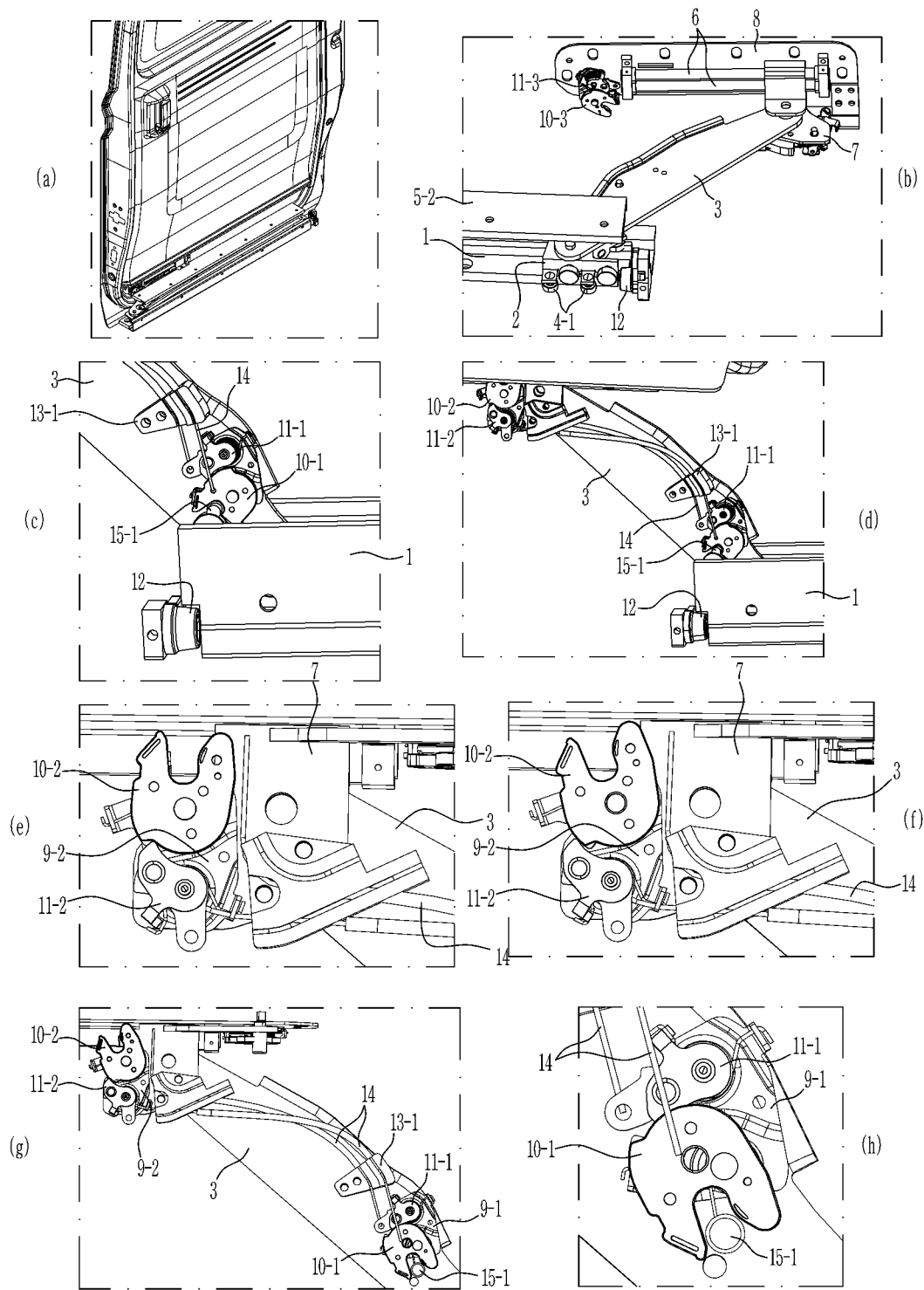
FIG. 10 is a diagram illustrating the primary sliding process of the door by the sliding door device for a vehicle according to the exemplary embodiment of the present disclosure.

FIG. 10 is a diagram illustrating the primary sliding process of the door by the sliding door device for a vehicle according to the exemplary embodiment of the present disclosure.

Referring to FIG. 10, when the door 50 slides to the rear of the vehicle while the door 50 is closed ((a) of FIG. 10), the linear slider 2 provided at the other end portion of the lower arm 3 is in contact with the stopper 12 provided at the end portion of the linear rail 1, and the slider assembly 7 provided at one end portion of the lower arm 3 is in contact with the end portion of the slider rail 6 extending in the longitudinal direction of the back plate 8 ((b) of FIG. 10). The door 50 slides while turning to the outside of the vehicle by the movement of the linear slider 2 and the fixation of slider assembly 7, so that the primary sliding is completed.

When the primary sliding of the door 50 is completed, the arm catch 10-1 rotates while being fitted into the arm striker 15-1 provided on the end portion of the vehicle body. Furthermore, the arm pawl 11-1 rotates while being in contact with the end face of the arm catch 10-1 by the rotation of the arm catch 10-1 and is inserted into the groove formed on the end face of the arm catch 10-1, so that the rotation of the arm catch 10-1 stops ((c) of FIG. 10). As a result, the other end portion of the lower arm 3 is fixed.

The arm catch 10-1 and the door pawl 11-2 are connected to each other by the cable 14, and the door catch 10-2 and the arm pawl 11-1 are connected to each other by the cable 14. When the arm catch 10-1 rotates, the cable 14 is pulled to rotate the door pawl 11-2 ((d) of FIG. 10). The cable 14 may be guided by cable holders 13-1 and 13-2 that are provided at a center portion of one surface of the lower arm 3.

When the arm catch 10-1 rotates, the door pawl 11-2 is interlocked and rotates by the cable 14 ((e) of FIG. 10), so that the state in which the door pawl 11-2 is inserted into the groove formed on the end face of the door catch 10-2 is released ((f) of FIG. 10). At this moment, the door latch 10-2 is in a state where it can be rotated, that is, the door latch B is in an unlocked state.

Therefore, when the primary sliding of the door 50 is completed, the arm latch A is in a fixed state, the door latch B is in the unlocked state ((g) and (h) of FIG. 10), and the door 50 prepares for the secondary sliding.

Figure 11:
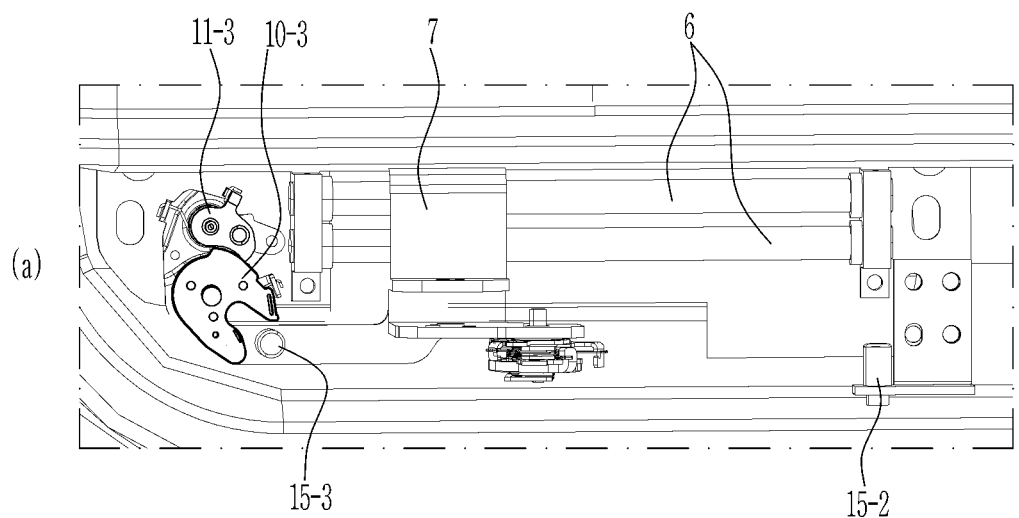
FIG. 11 is a diagram illustrating the secondary sliding process of the door by the sliding door device for a vehicle according to the exemplary embodiment of the present disclosure.
Figure 11:
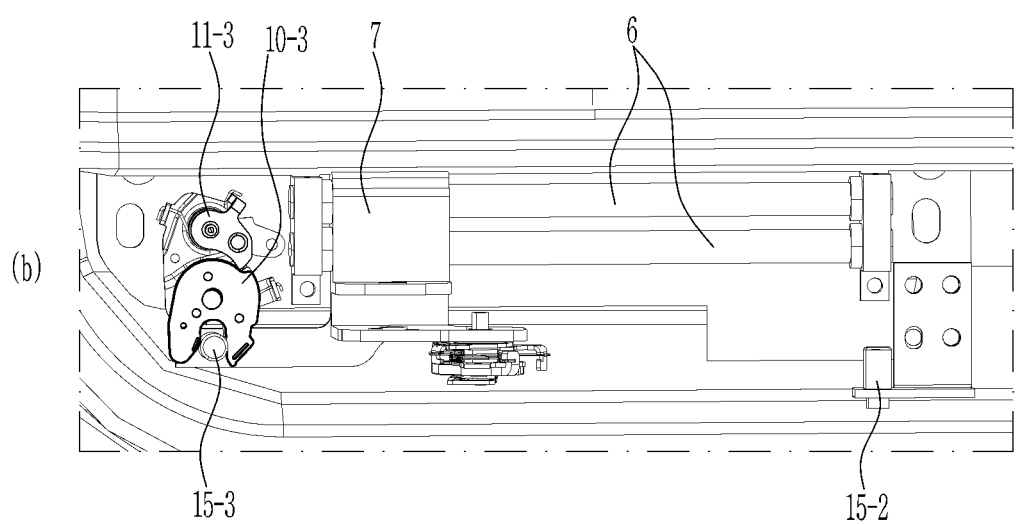

FIG. 11 is a diagram illustrating the secondary sliding process of the door by the sliding door device for a vehicle according to the exemplary embodiment of the present disclosure.

Referring to FIG. 11, when the door 50 secondarily slides while the door latch B is in an unlocked state, the slider rail 6 provided on the back plate 8 of the door 50 is in a form of the slider assembly 7 sliding to the left along the slider rail 6 while moving to the right ((a) of FIG. 11).

Accordingly, when the secondary sliding of the door 50 is completed, the door hold open latch C fixes the slider assembly 7. An open catch 10-3 and an open pawl 11-3 may be assembled to the open latch base 9-3 and coupled to the back plate 8. The open catch 10-3 rotates while being fitted into an open striker 15-3 provided in the slider assembly 7. Furthermore, the open pawl 11-3 rotates while being in contact with the end face of the open catch 10-3 by the rotation of the open catch 10-3 and is inserted into the groove formed on the end face of the open catch 10-3, so that the rotation of the open catch 10-3 stops ((b) of FIG. 11). As a result, one end portion of the lower arm 3 is fixed.

The closing process of the door 50 may be performed in a reverse order to that described with reference to FIG. 10, and FIG. 11. When the door 50 is closed after the second sliding is completed, the door hold open latch C is unlocked. In the instant case, the open pawl 11-3 may rotate by the handle inside the vehicle, a switch provided on the door 50, and the like. The open pawl 11-3 may be connected to a motor in the door 50 by a separate cable and generate tension by an electrical signal from the switch to rotate.

When the door hold open latch C is released and the door 50 primarily slides, the door latch B is fixed, and the arm latch A interlocked therewith is unlocked. Thereafter, the door 50 may secondarily slide to completely close the door.

As described above, according to various exemplary embodiments of the present disclosure, by applying a fastening structure of a catch and a striker to a lower arm and additionally employing a slidable door, the amount of penetration of the lower arm into a vehicle body may be eliminated and a flat structure of the vehicle body is implemented, so it is possible to reduce a step height of the vehicle body.

Furthermore, by implementing movement of a door in a linear direction, it is possible to improve a degree of freedom of layout and a degree of freedom of internal design.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding door apparatus for a vehicle, the sliding door apparatus comprising:
    a door that opens or closes a door opening formed in a vehicle body;
    a lower arm including a first end portion connected to an internal side of the door and a second end portion provided to slide along a vehicle body rail provided on the vehicle body;
    a linear slider which is rotatably connected to the second end portion of the lower arm and provided to slide along a linear rail provided on the vehicle body;
    a slider assembly which is provided between the first end portion of the lower arm and the internal side of the door, and allows the door to slide with respect to the first end portion of the lower arm;
    an arm latch which is located between the second end portion of the lower arm and the linear slider and fixes or releases the sliding of the second end portion of the lower arm; and
    a door latch which is located between the first end portion of the lower arm and the slider assembly and allows the slider assembly to be slidably fixed or released,
    wherein the arm latch includes:
        an arm catch which is rotatably provided at the second end portion of the lower arm, and
        an arm pawl that fixes or releases the rotation of the arm catch,
    wherein the door latch includes:
        a door catch which is rotatably provided at the first end portion of the lower arm, and
        a door pawl that fixes or releases the rotation of the door catch,
    wherein the door pawl is in contact with an end face of the door catch, and is inserted into a groove formed on the end face of the door catch when the door catch rotates, so that the rotation of the door catch stops, and
    wherein the door pawl rotates while being in contact with the end face of the door catch by the rotation of the door catch, so a state in which the door pawl is inserted into the groove formed on the end face of the door catch is released.

2. The sliding door apparatus of claim 1,
    wherein the vehicle body rail includes a lower rail and an upper rail that extend in a longitudinal direction from a lower side of the vehicle body, and
    wherein the linear slider includes a linear roller, and the linear roller rolls and slides along the linear rail.

3. The sliding door apparatus of claim 1, wherein an end portion of the linear rail is provided with a stopper that limits movement of the linear slider.

4. The sliding door apparatus of claim 1, further including:
    a door hold open latch that maintains or releases a state in which the slider assembly slides,
    wherein the slider assembly slides along a slider rail extending in a longitudinal direction of a back plate provided on the internal surface of the door.

5. The sliding door apparatus of claim 4, wherein the door hold open latch includes:
    an open catch which is rotatably provided at one end portion of a back plate provided on the internal surface of the door, and
    an open pawl that fixes or releases the rotation of the open catch.

6. The sliding door apparatus of claim 5, wherein the open catch rotates while being fitted into an open striker provided in the slider assembly while the door secondarily slides during door opening.

7. The sliding door apparatus of claim 5, wherein the open pawl is in contact with an end face of the open catch, and is inserted into a groove formed on the end face of the open catch when the open catch rotates, so that the rotation of the open catch stops.

8. The sliding door apparatus of claim 5, wherein the open catch and the open pawl are assembled to an open latch base and coupled to the back plate.

9. The sliding door apparatus of claim 1, wherein the sliding of the slider assembly is driven by being connected to a door handle of the vehicle to be driven independently.

10. The sliding door apparatus of claim 1, wherein the arm latch and the door latch are provided on a same surface of the lower arm.

11. The sliding door apparatus of claim 1, wherein when primary sliding of the door is completed during door opening, the arm catch rotates while being fitted into an arm striker provided at an end portion of the vehicle body.

12. The sliding door apparatus of claim 1, wherein the arm pawl is in contact with an end face of the arm catch, and is inserted into a groove formed on the end face of the arm catch when the arm catch rotates, so that the rotation of the arm catch stops.

13. The sliding door apparatus of claim 1, wherein the arm catch and the arm pawl are assembled to an arm latch base and coupled to the second end portion of the lower arm.

14. The sliding door apparatus of claim 1, wherein the door catch rotates while being fitted into a door striker provided in the internal side of the door while the door primarily slides during door closing.

15. The sliding door apparatus of claim 1, wherein the door catch and the door pawl are assembled to a door latch base and coupled to the first end portion of the lower arm.

16. The sliding door apparatus of claim 15, wherein the arm catch and the door pawl are interlocked by being connected to each other by a cable, and when the arm catch rotates while being fitted into an arm striker, the cable pulls and rotates the door pawl, and the door catch is unlocked from the door pawl.

17. The sliding door apparatus of claim 16, wherein the cable is guided by a cable holder provided at a center portion of one surface of the lower arm.

* * * * *